(12) United States Patent
Matthias et al.

(10) Patent No.: US 6,601,662 B2
(45) Date of Patent: Aug. 5, 2003

(54) POLYCRYSTALLINE DIAMOND CUTTERS WITH WORKING SURFACES HAVING VARIED WEAR RESISTANCE WHILE MAINTAINING IMPACT STRENGTH

(75) Inventors: Terry R. Matthias, Upton St. Leonards (GB); Nigel Dennis Griffin, Nympsfield (GB); Peter Raymond Hughes, Stroud (GB)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 09/947,678

(22) Filed: Sep. 6, 2001

(65) Prior Publication Data

US 2002/0074168 A1 Jun. 20, 2002

Related U.S. Application Data

(60) Provisional application No. 60/281,054, filed on Apr. 2, 2001, and provisional application No. 60/234,075, filed on Sep. 20, 2000.

(51) Int. Cl.[7] .............................................. E21B 10/46
(52) U.S. Cl. ....................... 175/374; 175/425; 175/431
(58) Field of Search ................................ 175/374, 378, 175/420.1, 425, 426, 428, 431, 433, 434

(56) References Cited

U.S. PATENT DOCUMENTS

| | | | |
|---|---|---|---|
| 3,136,615 A | 6/1964 | Bovenkerk | |
| 3,141,746 A | 7/1964 | DeLai | |
| 3,233,988 A | 2/1966 | Wentorf, Jr. | |

(List continued on next page.)

FOREIGN PATENT DOCUMENTS

| | | |
|---|---|---|
| EP | 0300699 A2 | 1/1989 |
| EP | 0329954 B1 | 8/1993 |
| EP | 0617207 A3 | 9/1994 |
| EP | 0462955 B1 | 12/1995 |
| EP | 0462091 B1 | 3/1996 |
| EP | 0595631 B1 | 4/1997 |
| EP | 0787820 A2 | 8/1997 |
| EP | 0500253 B1 | 11/1997 |
| EP | 0595630 B1 | 1/1998 |
| EP | 0612868 B1 | 7/1998 |
| EP | 0860515 A1 | 8/1998 |
| GB | 2048927 A | 12/1980 |
| GB | 2261894 A | 6/1993 |
| GB | 2268768 A | 1/1994 |
| GB | 2323398 A | 9/1998 |
| WO | WO96/34131 A1 | 10/1996 |
| WO | WO 00 28106 A1 | 5/2000 |

OTHER PUBLICATIONS

European Search Report, Application No. EP 01 30 7740, "Documents Considered to be Relevant".
English language abstract of WO 96/34131.

Primary Examiner—Frank S. Tsay
(74) Attorney, Agent, or Firm—Jeffery E. Daly

(57) ABSTRACT

Disclosed is a polycrystalline diamond or diamond-like element with greatly improved wear resistance without loss of impact strength. These elements are formed with a binder-catalyzing material in a high-temperature, high-pressure (HTHP) process. The PCD element has a body with a plurality of bonded diamond or diamond-like crystals forming a continuous diamond matrix that has a diamond volume density greater than 85%. Interstices among the diamond crystals form a continuous interstitial matrix containing a catalyzing material. The diamond matrix table is formed and integrally bonded with a metallic substrate containing the catalyzing material during the HTHP process. The diamond matrix body has a working surface, where a first portion of the interstitial matrix in the body adjacent to the working surface is substantially free of the catalyzing material, and a second portion of the interstitial matrix in the body adjacent to the working surface contains the catalyzing material. The first portion of the interstitial matrix and the second portion of the interstitial matrix have substantially the same impact strength.

50 Claims, 9 Drawing Sheets

U.S. PATENT DOCUMENTS

| | | |
|---|---|---|
| 4,108,614 A | 8/1978 | Mitchell |
| 4,151,686 A | 5/1979 | Lee et al. |
| 4,224,380 A | 9/1980 | Bovenkerk et al. |
| 4,247,304 A | 1/1981 | Morelock |
| 4,255,165 A | 3/1981 | Dennis et al. |
| 4,268,276 A | 5/1981 | Bovenkerk |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,861,350 A | 8/1989 | Phaal et al. |
| 4,871,377 A | 10/1989 | Frushour |
| 4,899,922 A | 2/1990 | Slutz et al. |
| 4,919,220 A | 4/1990 | Fuller et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A * | 4/1991 | Cho et al. ............... 51/295 |
| 5,027,912 A | 7/1991 | Juergens |
| 5,030,276 A | 7/1991 | Sung et al. |
| 5,092,687 A | 3/1992 | Hall |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts |
| 5,264,283 A | 11/1993 | Waldenstrom |
| 5,337,844 A | 8/1994 | Tibbitts |
| 5,379,853 A | 1/1995 | Lockwood |
| 5,439,492 A | 8/1995 | Anthony et al. |
| 5,464,068 A | 11/1995 | Najafi-Sani |
| 5,468,268 A | 11/1995 | Tank et al. |
| 5,496,638 A | 3/1996 | Waldenstrom |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,607,024 A | 3/1997 | Keith et al. |
| 5,620,382 A | 4/1997 | Cho et al. |
| 5,624,068 A | 4/1997 | Waldenstrom et al. |
| 5,667,028 A | 9/1997 | Truax et al. |
| 5,718,948 A | 2/1998 | Ederyd et al. |
| 5,722,499 A | 3/1998 | Nguyen et al. |
| 5,776,615 A | 7/1998 | Wong et al. |
| 5,833,021 A | 11/1998 | Mensa-Wilmot |
| 5,855,996 A * | 1/1999 | Corrigan et al. ............ 428/212 |
| 5,954,147 A | 9/1999 | Overstreet |
| 5,979,578 A | 11/1999 | Packer |
| 6,009,963 A | 1/2000 | Chaves et al. |
| 6,126,741 A | 10/2000 | Jones et al. |
| 6,248,447 B1 | 6/2001 | Griffin et al. |
| 6,269,894 B1 | 8/2001 | Griffin et al. |
| 6,344,149 B1 * | 2/2002 | Oles ........................... 216/11 |

* cited by examiner

POLYCRYSTALLINE DIAMOND CUTTERS WITH WORKING SURFACES HAVING VARIED WEAR RESISTANCE WHILE MAINTAINING IMPACT STRENGTH

This application claims priority from U.S. Provisional Patent Application No. 60/234,075 filed Sep. 20, 2000, and from U.S. Provisional Patent Application No. 60/281,054 filed Apr. 2, 2001.

BACKGROUND OF THE INVENTION

1. Field of the Invention

The invention relates to superhard polycrystalline material elements for wear, cutting, drawing, and other applications where engineered superhard surfaces are needed. The invention particularly relates to polycrystalline diamond and polycrystalline diamond-like (collectively called PCD) elements with greatly improved wear resistance and methods of manufacturing them.

2. Description of Related Art

Polycrystalline diamond and polycrystalline diamond-like elements are known, for the purposes of this specification, as PCD elements. PCD elements are formed from carbon based materials with exceptionally short inter-atomic distances between neighboring atoms. One type of diamond-like material similar to PCD is known as carbonitride (CN) described in U.S Pat. No. 5,776,615. In general, PCD elements are formed from a mix of materials processed under high-temperature and high-pressure into a polycrystalline matrix of inter-bonded superhard carbon based crystals. A common trait of PCD elements is the use of catalyzing materials during their formation, the residue from which, often imposes a limit upon the maximum useful operating temperature of the element while in service.

A well known, manufactured form of PCD element is a two-layer or multilayer-P CD element where a facing table of polycrystalline diamond is integrally bonded to a substrate of less hard material, such as tungsten carbide. The PCD element may be in the form of a circular or part-circular tablet, or may be formed into other shapes, suitable for applications such as hollow dies, heat sinks, friction bearings, valve surfaces, indentors, tool mandrels, etc. PCD elements of this type may be used in almost any application where a hard wear and erosion resistant material is required. The substrate of the PCD element may be brazed to a carrier, often also of cemented tungsten carbide. This is a common configuration for PCD's used as cutting elements, for example in fixed cutter or rolling cutter earth boring bits when received in a socket of the drill bit, or when fixed to a post in a machine tool for machining. These PCD elements are typically called polycrystalline diamond cutters (PDC).

There are numerous variations in the methods of manufacture of these PDC elements. For example various ranges of average diamond particle sizes may be utilized in the manufacture to enhance wear properties as shown in U.S. Pat. Nos. 4,861,350; 5,468,268; and 5,505,748 all herein incorporated by reference for all they disclose. Also, methods to provide a range of wear resistance across or into the working surface of a PDC are shown in U.S. Pat. Nos. 5,135,061 and 5,607,024 also herein incorporated by reference for all they disclose. However, because the wear resistance is varied by changing the average size of the diamond particles, there is an inherent trade-off between impact strength and wear resistance in these designs. As a consequence, the PDC elements with the higher wear resistance will tend to have poor impact strength, which for PDC's used in drilling applications, is often unacceptable.

Typically, higher diamond volume densities in the diamond table increases wear resistance at the expense of impact strength. However, modern PDC elements typically utilize often complex geometrical interfaces between the diamond table and the substrate as well as other physical design configurations to improve the impact strength. Although this allows wear resistance and impact strength to be simultaneously maximized, the tradeoff still exists, and has not significantly changed for the past several years prior to the present invention.

Another form of PCD element is a unitary PCD element without an integral substrate where a table of polycrystalline diamond is fixed to a tool or wear surface by mechanical means or a bonding process. These PCD elements differ from those above in that diamond particles are present throughout the element. These PCD elements may be held in place mechanically, they may be embedded within a larger PCD element that has a substrate, or, alternately, they may be fabricated with a metallic layer which may be bonded with a brazing or welding process. A plurality of these PCD elements may be made from a single PCD, as shown, for example, in U.S. Pat. Nos. 4,481,016 and 4,525,179 herein incorporated by reference for all they disclose.

PCD elements are most often formed by sintering diamond powder with a suitable binder-catalyzing material in a high-pressure, high-temperature press. One particular method of forming this polycrystalline diamond is disclosed in U.S. Pat. No. 3,141,746 herein incorporated by reference for all it discloses. In one common process for manufacturing PCD elements, diamond powder is applied to the surface of a preformed tungsten carbide substrate incorporating cobalt. The assembly is then subjected to very high temperature and pressure in a press. During this process, cobalt migrates from the substrate into the diamond layer and acts as a binder-catalyzing material, causing the diamond particles to bond to one another with diamond-to-diamond bonding, and also causing the diamond layer to bond to the substrate.

The completed PCD element has at least one body with a matrix of diamond crystals bonded to each other with many interstices containing a binder-catalyzing material as described above. The diamond crystals comprise a first continuous matrix of diamond, and the interstices form a second continuous matrix of interstices containing the binder-catalyzing material. In addition, there are necessarily a relatively few areas where the diamond to diamond growth has encapsulated some of the binder-catalyzing material. These 'islands' are not part of the continuous interstitial matrix of binder-catalyzing material.

In one common form, the diamond body constitutes 85% to 95% by volume and the binder-catalyzing material the other 5% to 15%. Such an element may be subject to thermal degradation due to differential thermal expansion between the interstitial cobalt binder-catalyzing material and diamond matrix beginning at temperatures of about 400 degrees C. Upon sufficient expansion the diamond-to-diamond bonding may be ruptured and cracks and chips may occur.

Also in polycrystalline diamond, the presence of the binder-catalyzing material in the interstitial regions adhering to the diamond crystals of the diamond matrix leads to another form of thermal degradation. Due to the presence of the binder-catalyzing material, the diamond is caused to graphitize as temperature increases, typically limiting the operation temperature to about 750 degrees C.

Although cobalt is most commonly used as the binder-catalyzing material, any group VIII element, including cobalt, nickel, iron, and alloys thereof, may be employed.

To reduce thermal degradation, so-called "thermally stable" polycrystalline diamond components have been produced as preform PCD elements for cutting and/or wear resistant elements, as disclosed in U.S. Pat. No. 4,224,380 herein incorporated by reference for all it discloses. In one type of thermally stable PCD element the cobalt or other binder-catalyzing material in conventional polycrystalline diamond is leached out from the continuous interstitial matrix after formation. Numerous methods for leaching the binder-catalyzing material are known. Some leaching methods are disclosed, for example, in U.S. Pat. Nos. 4,572,722 and 4,797,241 both herein incorporated by reference for all they disclose.

While leaching the binder-catalyzing material may increase the temperature resistance of the diamond to about 1200 degrees C., the leaching process also removes the cemented carbide substrate. In addition, because there is no integral substrate or other bondable surface, there are severe difficulties in mounting such material for use in operation.

The fabrication methods for this 'thermally stable' PCD element typically produce relatively low diamond volume densities, typically of the order of 80 volume % or less. This low diamond volume density enables a thorough leaching process, but the resulting finished part is typically relatively weak in impact strength. The low volume density is typically achieved by using an admixtures process and using relatively small diamond crystals with average particle sizes of about 15 microns or less. These small particles are typically coated with a catalyzing material prior to processing. The admixtures process causes the diamond particles to be widely spaced in the finished product and relatively small percentages of their outer surface areas dedicated to diamond-to-diamond bonding, often less than 50%, contributing to the low impact strengths.

In these so-called "thermally stable" polycrystalline diamond components, the lack of a suitable bondable substrate for later attachment to a work tool has been addressed by several methods. One such method to attach a bondable substrate to a "thermally stable" polycrystalline diamond preform is shown in U.S. Pat. No. 4,944,772 herein incorporated by reference for all it discloses. In this process, a porous polycrystalline diamond preform is first manufactured, and then it is re-sintered in the presence of a catalyzing material at high-temperatures and pressures with a barrier layer of other material which, in theory, prevents the catalyzing material from re-infiltrating the porous polycrystalline diamond preform. The resulting product typically has an abrupt transition between the preform and the barrier layer, causing problematic stress concentrations in service. This product would be considered to be more a joined composite than an integral body.

Other, similar processes to attach a bondable substrate to "thermally stable" polycrystalline diamond components are shown in U.S. Pat. Nos. 4,871,377 and 5,127,923 herein incorporated by reference for all they disclose. It is believed that the weakness of all these processes is the degradation of the diamond-to-diamond bonds in the polycrystalline diamond preform from the high temperature and pressure re-sintering process. It is felt that this degradation generally further reduces the impact strength of the finished product to an unacceptably low level below that of the preform.

In an alternative form of thermally stable polycrystalline diamond, silicon is used as the catalyzing material. The process for making polycrystalline diamond with a silicon catalyzing material is quite similar to that described above, except that at synthesis temperatures and pressures, most of the silicon is reacted to form silicon carbide, which is not an effective catalyzing material. The thermal resistance is somewhat improved, but thermal degradation still occurs due to some residual silicon remaining, generally uniformly distributed in the interstices of the interstitial matrix. Again, there are mounting problems with this type of PCD element because there is no bondable surface.

More recently, a further type of PCD has become available in which carbonates, such as powdery carbonates of Mg, Ca, Sr, and Ba are used as the binder-catalyzing material when sintering the diamond powder. PCD of this type typically has greater wear-resistance and hardness than the previous types of PCD elements. However, the material is difficult to produce on a commercial scale since much higher pressures are required for sintering than is the case with conventional and thermally stable polycrystalline diamond. One result of this is that the bodies of polycrystalline diamond produced by this method are smaller than conventional polycrystalline diamond elements. Again, thermal degradation may still occur due to the residual binder-catalyzing material remaining in the interstices. Again, because there is no integral substrate or other bondable surface, there are difficulties in mounting this material to a working surface.

Other efforts to combine thermally stable PCD's with mounting systems to put their improved temperature stability to use have not been as successful as hoped due to their low impact strength. For example, various ways of mounting multiple PCD elements are shown in U.S. Pat. Nos. 4,726,718; 5,199,832; 5,205,684; 5,238,074; 6,009,963 herein incorporated by reference for all they disclose. Although many of these designs have had commercial success, the designs have not been particularly successful in combining high wear and/or abrasion resistance while maintaining the level of toughness attainable in non-thermally stable PCD.

Other types of diamond or diamond like coatings for surfaces are disclosed in U.S. Pat. Nos. 4,976,324; 5,213,248; 5,337,844; 5,379,853; 5,496,638; 5,523,121; 5,624,068 all herein incorporated by reference for all they disclose. Similar coatings are also disclosed in GB Patent Publication No. 2,268,768, PCT Publication No. 96/34,131, and EPC Publications 500,253; 787,820; 860,515 for highly loaded tool surfaces. In these publications, diamond and/or diamond like coatings are shown applied on surfaces for wear and/or erosion resistance.

In many of the above applications physical vapor deposition (PVD) and/or chemical vapor deposition (CVD) processes are used to apply the diamond or diamond like coating. PVD and CVD diamond coating processes are well known and are described for example in U.S. Pat. Nos. 5,439,492; 4,707,384; 4,645,977; 4,504,519; 4,486,286 all herein incorporated by reference.

PVD and/or CVD processes to coat surfaces with diamond or diamond like coatings may be used, for example, to provide a closely packed set of epitaxially oriented crystals of diamond or other superhard crystals on a surface. Although these materials have very high diamond densities because they are so closely packed, there is no significant amount of diamond to diamond bonding between adjacent crystals, making them quite weak overall, and subject to fracture when high shear loads are applied. The result is that although these coatings have very high diamond densities, they tend to be mechanically weak, causing very poor impact toughness and abrasion resistance when used in highly loaded applications such as with cutting elements, bearing devices, wear elements, and dies.

Some attempts have been made to improve the toughness and wear resistance of these diamond or diamond like coatings by application to a tungsten carbide substrate and subsequently processing in a high-pressure, high-temperature environment as described in U.S. Pat. Nos. 5,264,283; 5,496,638; 5,624,068 herein incorporated by reference for all they disclose. Although this type of processing may improve the wear resistance of the diamond layer, the abrupt transition between the high-density diamond layer and the substrate make the diamond layer susceptible to wholesale fracture at the interface at very low strains, similar to the above described problems encountered with composite structures having barrier layers. This again translates to very poor toughness and impact resistance in service.

When PCD elements made with a cobalt or other group VIII metal binder-catalyzing material were used against each other as bearing materials, it was found that the coefficient of friction tended to increase with use. As described in U.S. Pat. No. 5,560,716 herein incorporated by reference for all it discloses and corollary European Patent specification No. 617,207, it was found that removal (by use of a hydrochloric acid wipe) of the cobalt-rich tribofilm which tended to build up in service from the surface of the PCD bearing element, tended to temporarily mitigate this problem. It was speculated that, during operation, some of the cobalt from the PCD at the surface migrates to the load area of the bearing, causing increased friction when two PCD elements act against each other as bearings. It is now believed that the source of this cobalt may be a residual by-product of the finishing process of the bearing elements, as the acid wipe remedy cannot effectively remove the cobalt to any significant depth below the surface.

Because the cobalt is removed only from the surface of the PCD, there is no effective change in the temperatures at which thermal degradation occurs in these bearing elements. Therefore the deleterious effects of the binder-catalyzing material remain, and thermal degradation of the diamond layer due to the presence of the catalyzing material still occurs.

BRIEF SUMMARY OF THE INVENTION

The present invention provides a superhard polycrystalline diamond or diamond-like element with greatly improved wear resistance without loss of impact strength. Collectively called PCD elements for the purposes of this specification, these elements are formed with a binder-catalyzing material in a high-temperature, high-pressure (HTHP) process. The PCD element has a plurality of partially bonded diamond or diamond-like crystals forming a continuous diamond matrix body with a diamond volume density greater than 85%. Interstices among the diamond crystals form a continuous interstitial matrix containing a catalyzing material. The diamond matrix table is formed and integrally bonded to a substrate containing the catalyzing material during the HTHP process. The diamond matrix body has a working surface, where a portion of the interstitial matrix in the body adjacent to the working surface is substantially free of the catalyzing material, and the remaining interstitial matrix contains the catalyzing material. Typically, less than about 70% of the body of the diamond matrix table is free of the catalyzing material.

The working surface that is substantially free of the catalyzing material is not subject to the thermal degradation encountered in the other areas of the working surface, resulting in improved wear resistance without loss of impact strength. In cutting elements, the processed working surface may be a portion of the facing table of the body, a portion of the peripheral surface of the body, or portions of all these surfaces.

In another embodiment, the catalyzing material is cobalt or other iron group metal, and the method of depleting the catalyzing material is to leach it from the interstices near the surface of a PCD element in an acid etching process. It is anticipated that the method of removing the catalyzing material from the surface may also be by electrical discharge, or other electrical or galvanic process, or by evaporation.

A further method of manufacture of a PCD element comprising a body integrally formed with a metallic substrate, the body comprising bonded diamond crystals and a catalyzing material is also disclosed. The treatment is performed by treating the body to render a volume thereof substantially free of the catalyzing material while permitting the catalyzing material to remain in at least some of the remaining volume of the body and while permitting the substrate to remain substantially unaffected when treating the body. The treatment provides an enhanced wear resistance to the treated portion of the element while maintaining the impact strength of the entire element substantially the same.

Disclosed is an element having a body comprising a plurality of partially bonded diamond crystals, a catalyzing material and an interstitial matrix; the body having a working surface. The interstitial matrix in the body adjacent to the working surface is substantially free of the catalyzing material, and the remaining interstitial matrix contains the catalyzing material. The portion of the working surface that is substantially free of the catalyzing material has substantially the same impact strength as the remaining interstitial matrix.

Similarly, a PCD element is disclosed with a body having a catalyzing material, an interstitial matrix, and a working surface. The interstitial matrix in the body adjacent to the working surface is substantially free of the catalyzing material, and the remaining interstitial matrix contains the catalyzing material.

Furthermore, a PCD element is disclosed having a body with a working surface. A first volume of the body remote from the working surface contains a catalyzing material, and a second volume of the body adjacent to the working surface is substantially free of the catalyzing material.

A PCD element is also disclosed comprising a diamond containing body integrally formed with a metallic substrate. The body has at least an 85% by volume diamond density and an interstitial matrix. The interstitial matrix in the body adjacent to a working surface is substantially free of the catalyzing material, and the interstitial regions where the body contacts the substrate contain the catalyzing material and have an average thickness greater than 0.15 mm.

Furthermore, a PCD element comprising a body of bonded diamonds integrally formed with a metallic substrate. The body has a working surface and at least an 85% by volume diamond density. A first volume of the body adjacent to the working surface contains a catalyzing material, and a second volume of the body adjacent to the working surface is substantially free of the catalyzing material. The first volume and the second volume have substantially the same impact strength.

A PCD element comprising a diamond containing body integrally formed with a metallic substrate. The body having at least an 85% by volume diamond density and an interstitial matrix, a first portion of the interstitial matrix in the body adjacent to a working surface is substantially free of the catalyzing material, a second portion of the interstitial matrix in the body adjacent to a working surface contains the catalyzing material. The interstitial matrix where the body contacts the substrate contains the catalyzing material and has an average thickness greater than 0.15 mm. The first portion of the interstitial matrix and the second portion of the interstitial matrix have substantially the same impact strength.

In addition, a preform cutting element is disclosed. It has a body of a superhard polycrystalline material comprising a plurality of partially bonded superhard crystals integrally formed with a metallic substrate, a plurality of interstitial regions among the superhard crystals and a catalyzing material. The body has at least an 85% by volume diamond density and a cutting surface. The interstitial regions adjacent to at least a first portion of the cutting surface are substantially free of the catalyzing material, the interstitial regions adjacent to a second portion of the cutting surface contain the catalyzing material, and the interstitial regions where the body contacts the substrate contain the catalyzing material and have an average thickness greater than 0.15 mm. Also, the first portion of the cutting surface and the second portion have substantially the same impact strength.

The PCD elements of the present invention may be used for wear, cutting, drawing, and other applications where engineered diamond surfaces are needed. Specific applications are as cutting elements in rotary drill bits of both the fixed cutter type and the rolling cutter type, as hollow dies, heat sinks, friction bearings, valve surfaces, indentors, tool mandrels, etc. The PCD element of the present invention may be used to machine abrasive wood products, ferrous and nonferrous materials and also very hard or abrasive engineering materials such as stone and asphalt and the like.

DETAILED DESCRIPTION OF THE INVENTION AND THE PREFERRED EMBODIMENT

Figure 1A:
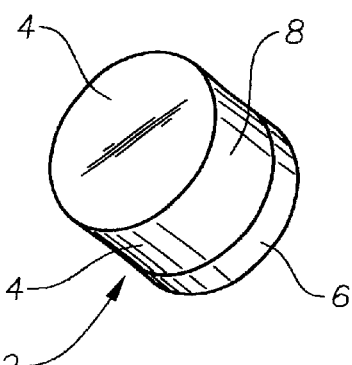
FIG. 1A is a typical PCD element of the present invention.

The polycrystalline diamond or diamond-like material (PCD) element 2 of the present invention is shown in FIG. 1A. The PCD element 2 has a plurality of partially bonded superhard, diamond or diamond-like, crystals 60, (shown in FIGS. 7 and 9) a catalyzing material 64, and an interstitial matrix 68 formed by the interstices 62 among the crystals 60. The element 2 also has one or more working surfaces 4 and the diamond crystals 60 and the interstices 62 form the volume of the body 8 of the PCD element 2. Preferably, the element 2 is integrally formed with a metallic substrate 6, typically tungsten carbide with a cobalt binder material. To be effective when used in an abrasive wear application, the volume density of the diamond in the body 8 must be greater than 85 volume %, and preferably be higher than 90%.

The working surface 4 is any portion of the PCD body 8 which, in operation, may contact the object to be worked. In this specification, when the working surface 4 is discussed, it is understood that it applies to any portion of the body 8 which may be exposed and/or used as a working surface. Furthermore, any portion of any of the working surface 4 is, in and of itself, a working surface.

During manufacture, under conditions of high-temperature and high-pressure (HTHP), the interstices 62 among the crystals 60 fill with the catalyzing material 64 followed by bonds forming among the crystals 60. In a further step of the manufacture, some of the catalyzing material 64 is selectively depleted from some of the interstices 62. The result is that a first volume of the body 8 of the PCD element 2 remote from the working surface 4 contains the catalyzing material 64, and a second volume of the body 8 adjacent to the working surface 4 is substantially free of the catalyzing material 64. The interstices 62 which are substantially free of the catalyzing material 64 are indicated by numeral 66.

Therefore, the interstitial matrix 68 of the body 8 adjacent to at least a portion of the working surface 4 is substantially free of the catalyzing material 64, and the remaining interstitial matrix 68 contains the catalyzing material 64. As previously stated, the PCD element 2 is preferably bonded in the HPHT process to a substrate 6 of less hard material, usually cemented tungsten carbide or other metallic material, but use of a substrate 6 is not required.

Because the body adjacent to the working surface 4 is substantially free of the catalyzing material 64, the deleterious effects of the binder-catalyzing material 64 are substantially decreased, and thermal degradation of the working surface 4 due to the presence of the catalyzing material 64 is effectively eliminated. The result is a new PCD element 2 that has the enhanced thermal properties approximating that of the so called thermally stable PCD elements, while maintaining the toughness, convenience of manufacture, and bonding ability of the traditional PDC elements. This translates to higher wear resistance in cutting applications, higher heat transfer capacity in heat sink applications, higher load capacity in bearing applications, less surface distortion in valve applications, and has advantages in numerous other applications including hollow dies, indentors, tool mandrels, and wear elements. These benefits are gained without loss of impact strength in the elements. Details of specific applications of the new PCD element 2 will be discussed in more detail later in the specification.

Figure 8:
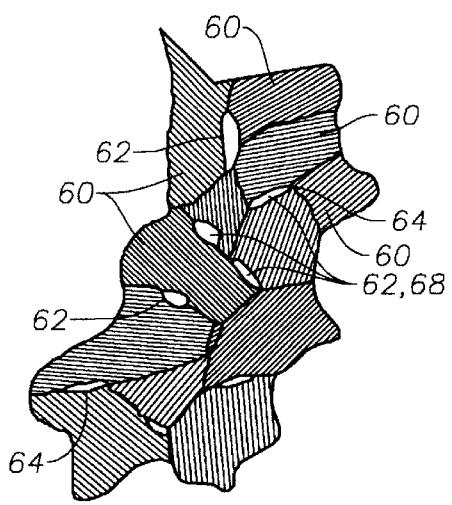
FIG. 8 is a micro-structural representation of a PCD element of the prior art, showing the bonded diamond crystals, with the interstitial regions and the random crystallographic orientation of the individual crystals.
Figure 6:
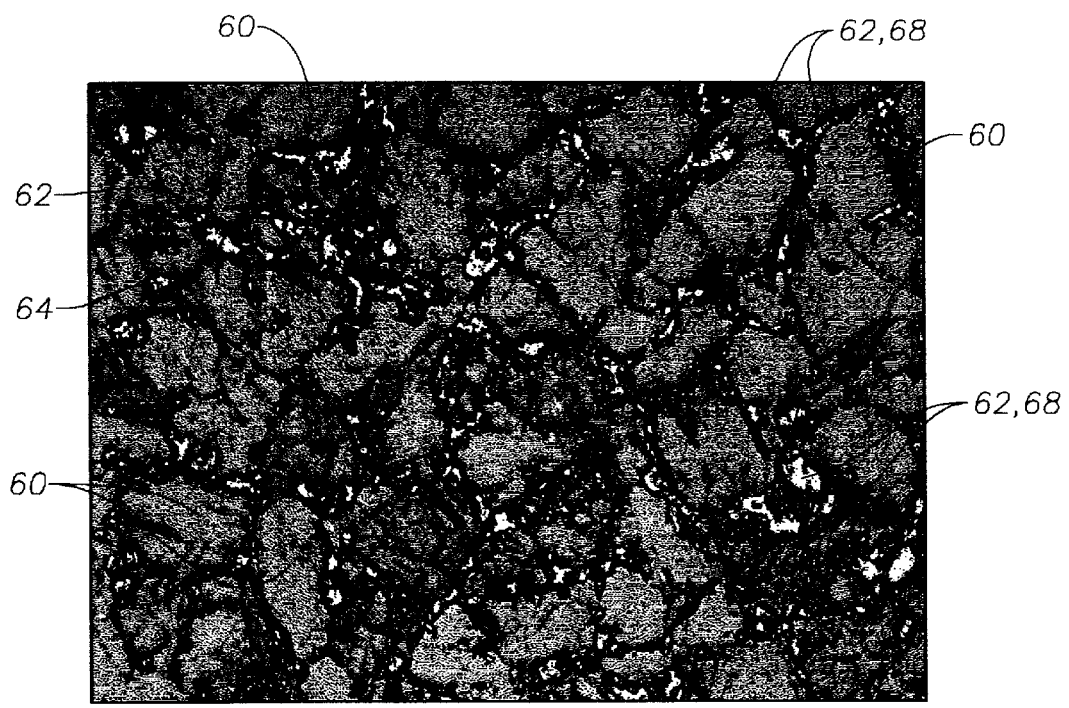
FIG. 6 is a photo-micrograph of the surface of a PCD element of the prior art showing the binder-catalyzing material in the interstitial regions.

Referring now to the photo-micrograph of a prior art PCD element in FIG. 6, and also the microstructural representation of a PCD element of the prior art in FIG. 8, it is well known that there is a random crystallographic orientation of the diamond or diamond-like crystals 60 as shown by the parallel lines representing the cleavage planes of each crystal 60. As can be seen, adjacent crystals 60 have bonded together with interstitial spaces 62 among them. Because the cleavage planes are oriented in different directions on adjacent crystals 60 there is generally no straight path available for diamond fracture. This structure allows PCD materials to perform well in extreme loading environments where high impact loads are common.

In the process of bonding the crystals 60 in a high-temperature, high-pressure press, the interstitial spaces 62 among the crystals 60 become filled with a binder-catalyzing material 64. It is this catalyzing material 64 that allows the bonds to be formed between adjacent diamond crystals 60 at the relatively low pressures and temperatures present in the press.

The prior art PCD element has at least one continuous matrix of crystals 60 bonded to each other with the many interstices 62 containing a binder-catalyzing material 64, typically cobalt or other group VIII element. The crystals 60 comprise a first continuous matrix of diamond, and the interstices 62 form a second continuous matrix known as the interstitial matrix 68, containing the binder-catalyzing material. In addition, there are necessarily a relatively few areas where the diamond to diamond growth has encapsulated some of the binder-catalyzing material. These 'islands' are not part of the continuous interstitial matrix 68 of binder-catalyzing material 64.

Figure 9:
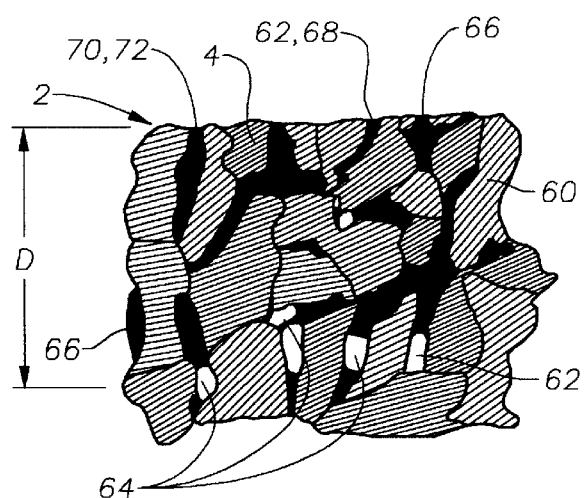
FIG. 9 is a micro-structural representation of the PCD element of the present invention as shown in FIG. 7, indicating the depth of the catalyzing material free region relative to the surface of the PCD element.
Figure 7:
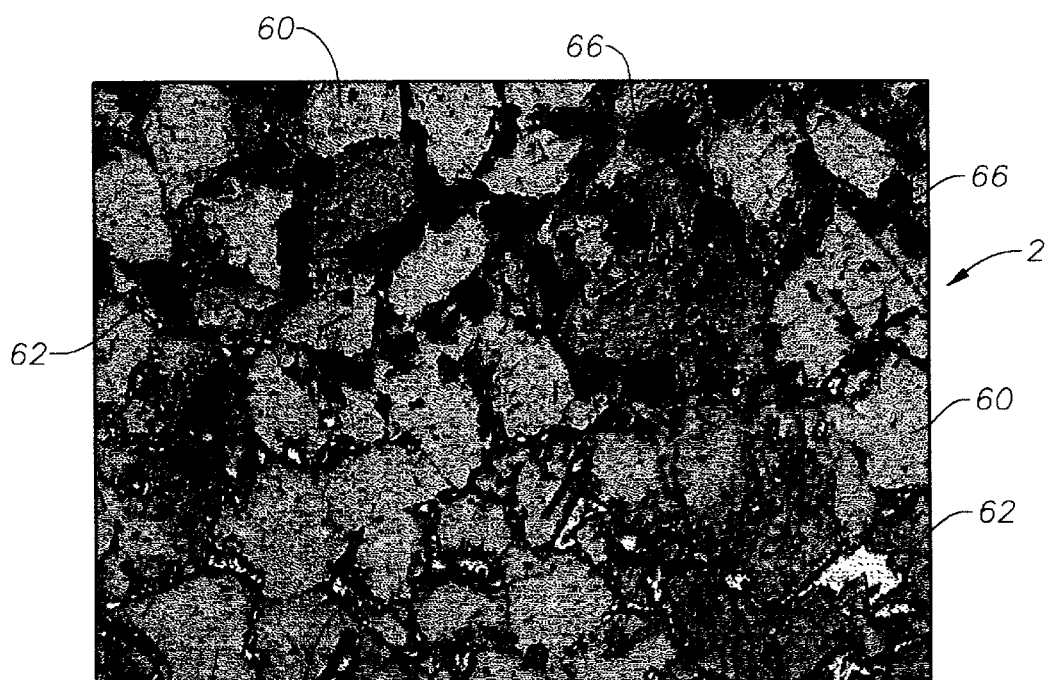
FIG. 7 is a photo-micrograph of the PCD element of the present invention showing a first portion with a catalyzing material in the interstitial regions and a second portion without the catalyzing material in the interstitial regions.

Referring now to FIGS. 7 and 9, shown is a cross section of the PCD element 2 of the present invention. The PCD element 2 may be formed in the same manner as the prior art PCD elements described above. In a preferred embodiment, after a preliminary cleanup operation or at any time thereafter in the process of manufacturing, the working surface 4, 70, 72 of the PCD element 2 is processed in a manner which removes a portion of the binder-catalyzing material from the adjacent body. The result is that the interstices 62 among the diamond crystals 60 adjacent to the working surface are substantially free of the catalyzing material 64 indicated by numeral 66. The portion of the working surface 4, 70, 72 that is free of the catalyzing material 64 is not subject to the thermal degradation encountered in the other areas of the PCD, resulting in improved thermal characteristics.

The average diamond volume density in the body 8 of the PCD element 2 of the present invention ranges from about 85% to about 99%. The high diamond volume density is achieved by using diamond crystals 60 with a range of particle sizes, with an average particle size ranging from about 30 to about 60 microns. Typically, the diamond mixture may comprise 20% to 60% diamond crystals 60 in the 5–15 micron range, 20% to 40% diamond crystals 60 in the 25–40 micron range, and 20% to 40% diamond crystals 60 in the 50–80 micron diameter range, although numerous other size ranges and percentages may be used. This mixture of large and small diamond crystals 60 allows the diamond crystals 60 to have relatively high percentages of their outer surface areas dedicated to diamond-to-diamond bonding, often approaching 95%, contributing to a relatively high apparent abrasion resistance.

There are many methods for removing or depleting the catalyzing material 64 from the interstices 62. In one method, the catalyzing material 64 is cobalt or other iron group material, and the method of removing the catalyzing material 64 is to leach it from the interstices 62 near the working surface 4, 70, 72 of a PCD element 2 in an acid etching process to a depth of greater than about 0.2 mm. It is also possible that the method of removing the catalyzing material 64 from near the surface may be by electrical discharge, or other electrical or galvanic process or by evaporation.

In another method for depleting the catalyzing material 64 from the interstices 62, the catalyzing material 64 is depleted by combining it chemically, such as alloying, with another material such that it no longer acts as a catalyzing material. In this method, a material may remain in the interstices among the diamond crystals 60, but that material no longer acts as a catalyzing material 64—effectively removing it.

In still another method for depleting the catalyzing material 64 from the interstices 62, the catalyzing material 64 is removed by causing it to transform into a material that no longer acts as a catalyzing material. This may be accomplished by a crystal structure change, phase change, mechanical 'working', thermal treatment or other treatment methods. This method may apply to non-metallic or non-reactive catalyzing materials. Again, a material may remain in the interstices 62 among the diamond crystals, but that material no longer acts as a catalyzing material 64—effectively removing the catalyzing material.

Once the catalyzing material 64 adjacent to the working surface 4, 70, 72 has been rendered ineffective, the PCD element 2 of the present invention is no longer susceptible to the type of thermal degradation known to occur in the prior art PCD elements. As previously described, there are two modes of thermal degradation known to be caused by the catalyzing material 64. The first mode of thermal degradation begins at temperatures as low as about 400 degrees C. and is due to differential thermal expansion between the catalyzing material 64 in the interstices 62 and the crystals 60. Upon sufficient expansion the diamond-to-diamond bonding may be ruptured and cracks and chips may occur.

The second mode of thermal degradation begins at temperatures of about 750 degrees C. This mode is caused by the catalyzing ability of the binder-catalyzing material 64 contacting the crystals 60, and causing the crystals 60 to graphitize as the temperature exceeds about 750 degrees C. As the crystals 60 graphitize, they undergo a huge volume increase resulting in cracking and dis-bond from the body 4. Even a coating of a few microns of the catalyzing material 64 on the surfaces of the diamond crystals 60 can enable this mode of thermal degradation.

It would therefore be appreciated by those skilled in the art that for maximum benefit, the catalyzing material 64 must be removed both from the interstices 62 among the diamond crystals 60 and from the surfaces of the diamond crystals 60 as well. If the catalyzing material 64 is removed from both the surfaces of the diamond crystals 60 and from the interstices 62 the onset of thermal degradation for the diamond crystals 60 in that region would approach 1200 C.

This dual degradation mode, however, provides some unexpected benefits. For example, in many applications it is desirable to engineer the wear rate of the working surface. In the present invention, this may be accomplished by changing the treatment process such that in areas requiring maximum wear resistance, the catalyzing material is depleted from both the interstices 62 and the surfaces of the diamond crystals 60. In areas where less wear resistance is desired, for example in a self sharpening tool, those areas would be treated so as to deplete the catalyzing material 64 primarily from the interstices 62, but allowing some, if not all, of the diamond crystals 60 to remain in contact with the catalyzing material.

This selective treatment process could provide, for example, a cutting element that would be self-sharpening as is wears in operation. In these applications, the PCD element 2, 50, 52 has a body 8 of bonded diamonds 60 integrally formed with a metallic substrate 32, 51. The body 8 has a working surface 70, 72 and at least an 85% by volume diamond density. A first volume of the body 8 adjacent to the working surface 70, 72 contains a catalyzing material, and a second volume of the body 8 adjacent to the working surface 70, 72 is substantially free of the catalyzing material. In these elements, the first volume and the second volume have substantially the same impact strength. FIGS. 13–36 show some of configurations where this selective treatment is desirable for cutting elements, and will be described in more detail later.

It should be apparent, that it is more difficult to remove the catalyzing material 64 from the surfaces of the diamond crystals 60 than from the interstices 62. For this reason, depending upon the manner in which the catalyzing material is depleted, to be effective in reducing thermal degradation, the depth of depletion of the catalyzing material 64 from the working surface 4 may vary depending upon the method used for depleting the catalyzing material 64.

In some applications, improvement of the thermal threshold to above 400 C but less than 750 C is adequate, and therefore a less intense catalyzing material 64 depletion process is permissible. As a consequence, it would be appreciated that there are numerous combinations of catalyzing material 64 depletion methods which could be applied to achieve the level of catalyzing material 64 depletion required for a specific application.

In this specification, when the term 'substantially free' is used referring to catalyzing material 64 in the interstices 62, the interstitial matrix 68, or in a volume of the body 8, it should be understood that many, if not all, the surfaces of the adjacent diamond crystals 60 may still have a coating of the catalyzing material 64. Likewise, when the term 'substantially free' is used referring to catalyzing material 64 on the surfaces of the diamond crystals 60, there may still be catalyzing material 64 present in the adjacent interstices 62.

With the catalyzing material 64 removed or depleted, two major mechanisms for thermal degradation are no longer present. However, it has been found that the catalyzing material 64 has to be removed at a depth sufficient to allow the bonded crystals 60 to conduct away the heat generated by a thermal event to below the degradation temperature of the crystals 60 where the catalyzing material 64 is present.

In one set of laboratory tests, heat was input into a PCD element 2 configured as a cutting element 10. Since this test was designed as a standard wear test for these cutting elements, it provided a reasonable comparison of cutting elements 10 with various depths of the catalyzing material 64 removal. In these tests, care was taken to assure the depletion process removed the catalyzing material 64 from both the interstices 62 and from the surfaces of the diamond crystals 60. The test was designed such that a repeatable input of heat was applied to the cutting edge of the PCD cutting element 10 for a known period of time.

Once the test was complete, a wear index was calculated. The higher the wear index, the better the wear resistance. Due to the nature of the test, it is assumed that an increased wear index number indicates increased resistance to thermal degradation of the working surface 70, 72 of the cutting element 10.

Figure 10:
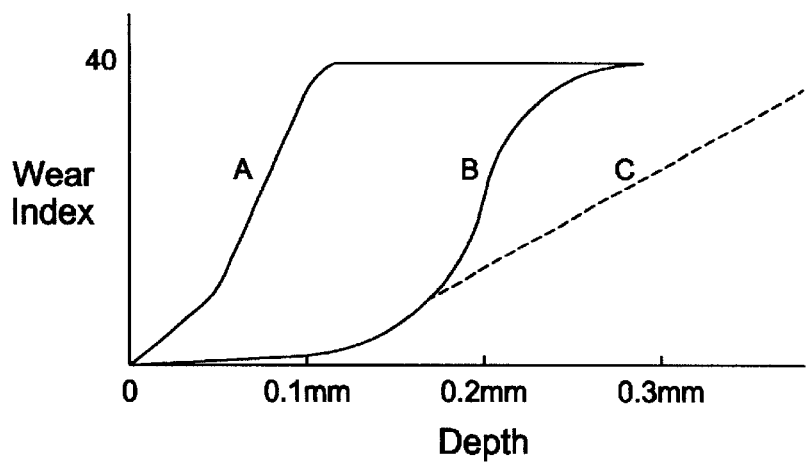
FIG. 10 is a graph of the relative wear indices of several embodiments of the PCD element of the present invention.

As can be seen in curve 'A' in the graph of FIG. 10 there is a dramatic increase in the wear index result for cutting elements 10 when the catalyzing material 64 depletion depth approaches 0.1 mm. Therefore, for the types of heat input common in cutting elements 10, a 0.1 mm depth is the critical depletion depth from the working surface 4, 70, 72 when the catalyzing material 64 is removed from both interstices 62 and from the surfaces of the diamond crystals 60.

In other tests, on cutting elements 10 made with a more economical process for removing the catalyzing material 64, the wear versus depth of depletion is believed to approximate that shown in curve 'B' of FIG. 10. The catalyzing material 64 depletion process used in these cutters was not as effective for removing the catalyzing material 64 from the surfaces of the diamond crystals 60 as the process of curve 'A'. Therefore, it was not until most of the catalyzing material 64 was removed from the interstices 62 to a depth of about 0.2 mm that the wear rate improved to that of curve 'A'. It was found that the impact strength of these cutting elements 10 was substantially unchanged from untreated elements.

Figure 12:
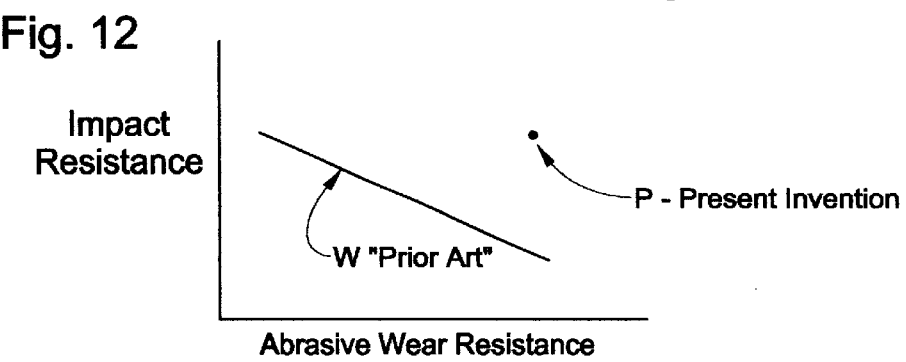
FIG. 12 is a graph representing the typical abrasive wear resistance vs. impact resistance of the prior art cutting elements compared with a cutting element of the present invention.

Referring now to FIG. 12, to visually demonstrate the comparison of the invention's improvement in wear resistance while maintaining impact strength, a typical, impact resistance versus abrasive wear resistance curve well known and well established for prior art cutting elements is indicated by curve 'W'. The point P on the graph relatively indicates the properties of the cutting element of the present invention. As can be seen, P lies in the top right corner area of the graph, which represents to those skilled in the art a significant and substantial improvement in wear resistance of cutting elements while maintaining impact strength.

It is believed that thermal degradation relating to wear rates as shown in curve 'C' of FIG. 10 can be engineered into PCD elements 2 where it is beneficial. For example, it may be desirable to have edges of curved cutting elements 10 remote from the center of contact to wear more quickly than the center point. This would tend to preserve the curved shape of the cutting element, rather than having it become a flat surface.

Improved thermal degradation resistance improves wear rates because diamond is an extremely good thermal conductor. If a friction event at working surface 4, 70, 72 caused a sudden, extreme heat input, the bonded diamond crystals would conduct the heat in all directions away from the event. This would permit an extremely high temperature gradient through the material, possibly 1000 C per mm or higher. A gradient this steep would enable the working surface 4, 70, 72 to reach 950 C, and not cause significant thermal degradation if interstices 62 and the surfaces of the diamond crystals 62 adjacent to the working surface are substantially free of the catalyzing material 64 to a depth of just 0.2 mm from the source of the heat.

It should be apparent that the temperature gradient will vary depending upon the crystal 60 size and the amount of inter-crystal bonding. One convenient way to characterize this is the volume density of the diamond in the body 8. Under normal manufacturing methods, as the volume density of the diamond increases, the potential temperature gradient through the material also increases. This implies that a material otherwise identical that which produced curve 'B' in FIG. 10, save for an increased diamond volume density, would subsequently produce a wear index closer to the curve 'A' in FIG. 10.

In field tests of cutting elements 10 for earth boring bits, removal of substantially all of the catalyzing material 64 from the interstices 62 to a distance D of about 0.2 mm to about 0.3 mm from a working surface 4, 70, 72 produced dramatic improvements in wear resistance, with a combination of a 40% increase in rate of penetration and a 40% improvement in wear resistance without loss of impact strength. The improvement in wear resistance indicates that the attrition of the diamond crystals 60 due to catalyzing material 64 induced thermal degradation was dramatically reduced. The rate of penetration increase is believed to be due to the ability of the cutter to remain 'sharper' longer due to the increased wear resistance.

It is believed, however, that as the volume density of the diamond in the body 8 increases from the 85%–90% range to the 95%–99% range, the distance D needed to produce a particular wear index will decrease. Therefore, it is also believed that a distance D of less than 0.1 mm could provide approximately the same wear index in a cutting element with a diamond density of the body approaching 99% as the 0.2 mm to 0.3 mm D distance in a body with 85% to 90% diamond volume density.

It is important when removing the catalyzing material 64 from the interstices 62 that the underlying substrate 6, 32 is not also affected. It is therefore very important that at least a portion of the diamond layer has the catalyzing material 64 remaining in the interstices 62. It has been found that when depleting the catalyzing material 64 from a flat surface having a planar interface with the substrate 6, 32, a layer with a minimum thickness of about 0.15 mm containing the catalyzing material 64 must remain to assure that the underlying substrate 6, 32 is not affected.

Quantifying this amount for PDC's in general is problematic, because some interaction of the depletion process and the substrate can be tolerated, and geometries can be complex. However, one way to quantify this is that the portion of the body 8 contacting the substrate 6,32 must have the catalyzing material 64 remaining in the interstices 62 to an average thickness of greater than 0.15 mm.

Another way to quantify this is to express the minimum amount of catalyzing material 64 remaining in the interstices 62 as a volume percent. It is known that with a very thin, flat diamond layer, a 0.15 mm layer containing the catalyzing material 64 is required in a 0.5 mm thick body. It is therefore reasonable to assume that a minimum of 30% of the volume of the body 8 must have interstices 62 containing the catalyzing material 64 for PDC elements of the present invention, particularly with the size ranges of typically used PDC cutters.

Figure 11A:
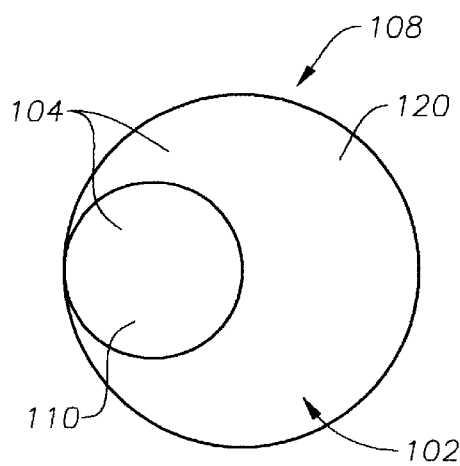
FIG. 11A is a front view of an encapsulated PCD embodiment of the PCD element of the present invention.
Figure 11B:
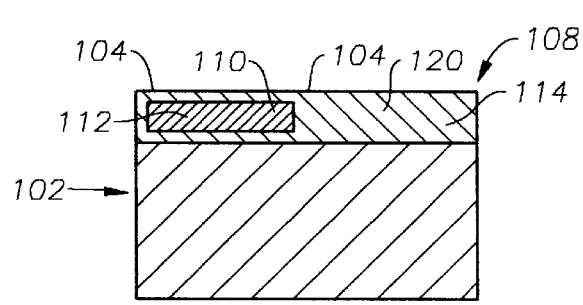
FIG. 11B is a section view of another encapsulated PCD embodiment of the PCD element of the present invention.
Figure 11C:
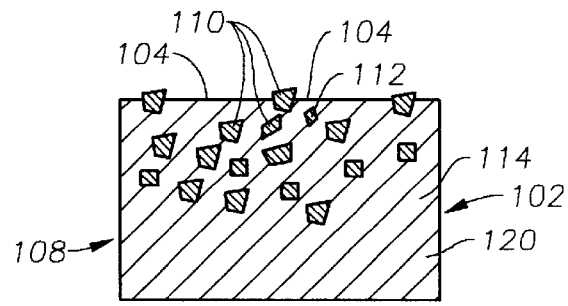
FIG. 11C is a section view of still another encapsulated PCD embodiment of the PCD element of the present invention.

There are other possible constructions of PCD elements that benefit from depletion or removal of the catalyzing material 64 as described above. As shown in FIGS. 11A, 11B and 11C another embodiment of the present invention is a compound PCD element 102. The PCD element 102 has a body 108 with a group VIII binder-catalyzing material with a second preformed PCD element 110 embedded within it. The embedded PCD element 110 may be flush with the working surface 104 of the encapsulating PCD element 120 as shown in FIG. 11A, or it may be embedded wholly within the encapsulating PCD element 120 as shown in FIG. 11B. This embedded PCD element 110 is made in a process using powdery carbonates of Mg, Ca, Sr, and Ba as the binder-catalyzing material, and is formed into a compound PCD element as described in the commonly assigned co-pending U.S. Pat. No. 6,248,447 herein incorporated by reference.

In this embodiment, since the embedded preformed PCD element 110 is formed at higher pressures, the diamond density may be made higher than that of the encapsulating PCD element 120. In this construction since the embedded PCD element 110 has a catalyzing material with a higher activation temperature, it may for example, be beneficial to deplete the catalyzing material only in the working surface of the encapsulating PCD element 120. Furthermore, the embedded PCD element 110 may be positioned within the encapsulating PCD element 120 to take advantage of the higher impact resistance of the embedded PCD element 110 combined with the improved wear resistance of the encapsulating element 120.

As shown in FIGS. 9, 11A, 11B, and 11C, the element 102 has a plurality of partially bonded diamond crystals 60, a catalyzing material 64 and a body 108 with a working surface 104. The volume 112 of the body adjacent the working surface 104 has a substantially higher diamond density than elsewhere 114 in the body 108, and the volume 112 is substantially free of the catalyzing material 64.

Several embedded PCD elements 110 may be arranged in the compound element 100, as shown in FIG. 11C, in a manner where the best of both impact resistance and improved wear resistance may be realized.

It may be desirable to deplete the catalyzing material in the embedded PCD element 110 as well as the catalyzing material of the encapsulating PDC element 120. This combination would provide an element with the highest possible impact strength combined with the highest possible wear resistance available in diamond elements for commercial use.

Figure 1B:
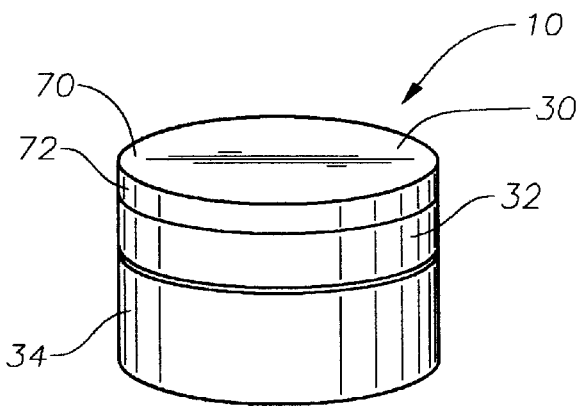
FIG. 1B is a typical PCD of the present invention shown as a cutting element.

One particularly useful application for the PCD element 2 of the present invention is as cutting elements 10, 50, 52 as shown in FIGS. 1B, 4 and 5, and FIGS. 13–36B. The working surface of the PCD cutting elements 10, 50, 52 may be a top working surface 70 and/or a peripheral working surface 72. The PCD cutting element 10 of FIG. 1B is one that may be typically used in fixed cutter type rotary drill bits 12, or for gauge protection in other types of downhole tools. The PCD cutting element 50 shown in FIG. 5 may be shaped as a dome 39. This type of PCD cutting element 50 has an extended base 51 for insertion into sockets in a rolling cutter drill bit 38 or in the body of both types of rotary drill bits, 12, 38 as will be described in detail.

Figure 4:
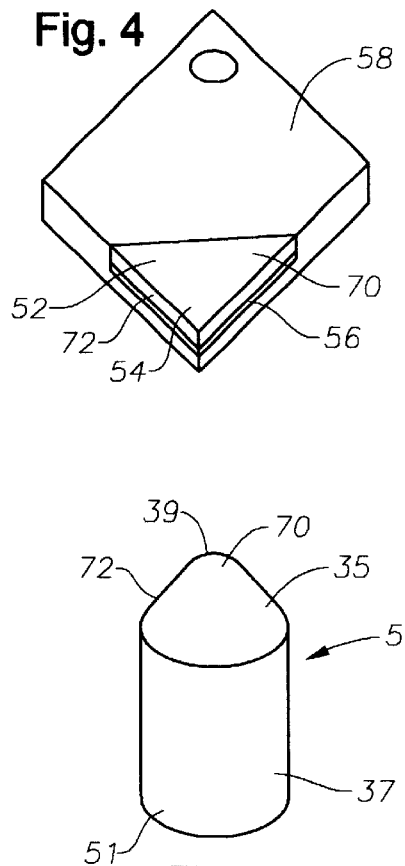
FIG. 4 is a perspective view of an insert used in machine tools utilizing the PCD element of the present invention.

The PCD cutting element 52 of FIG. 4 is adapted for use in a machining process. Although the configuration of the cutting element 52 in FIG. 4 is rectangular, it would be appreciated by those skilled in the art that this element could be triangular, quadrilateral or many other shapes suitable for machining highly abrasive products that are difficult to machine with conventional tools.

Figure 2:
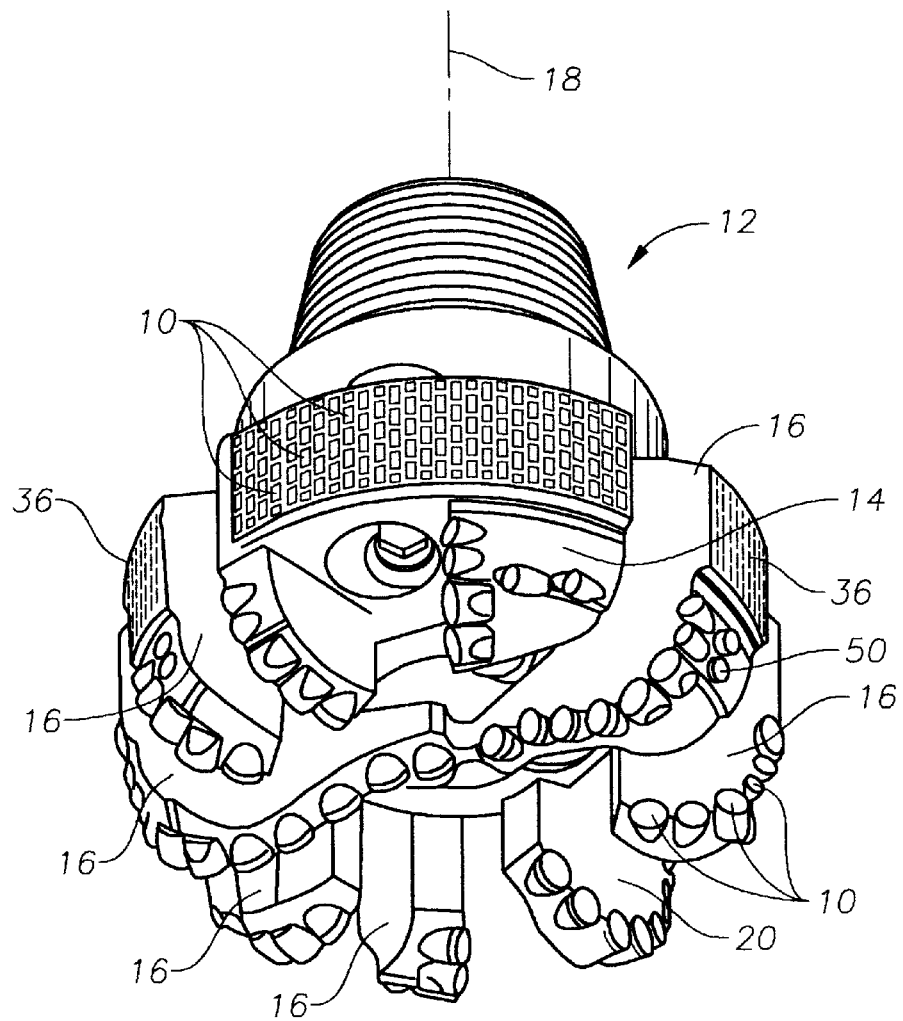
FIG. 2 is a side view of a fixed cutter rotary drill bit using a PCD element of the present invention.

The PCD cutting element 10 may be a preform cutting element 10 of a fixed cutter rotary drill bit 12 (as shown in FIG. 2). The bit body 14 of the drill bit is formed with a plurality of blades 16 extending generally outwardly away from the central longitudinal axis of rotation 18 of the drill bit. Spaced apart side-by-side along the leading face 20 of each blade is a plurality of the PCD cutting elements 10 of the present invention.

Typically, the PCD cutting element 10 has a body in the form of a circular tablet having a thin front facing table 30 of diamond or diamond-like (PCD) material, bonded in a high-pressure high-temperature press to a substrate 32 of less hard material such as cemented tungsten carbide or other metallic material. The cutting element 10 is preformed and then typically bonded on a generally cylindrical carrier 34 which is also formed from cemented tungsten carbide, or may alternatively be attached directly to the blade. The PCD cutting element 10 has working surfaces 70 and 72.

The cylindrical carrier 34 is received within a correspondingly shaped socket or recess in the blade 16. The carrier 34 will usually be brazed or shrink fit in the socket. In operation the fixed cutter drill bit 12 is rotated and weight is applied. This forces the cutting elements 10 into the earth being drilled, effecting a cutting and/or drilling action.

The PCD cutting elements 10 may also be applied to the gauge region 36 of the bit 12 to provide a gauge reaming action as well as protecting the bit 12 from excessive wear in the gauge region 36. In order to space these cutting elements 10 as closely as possible, it may be desirable to cut the elements into shapes, such as the rectangular shape shown, which more readily fit into the gauge region 36.

Figure 3:
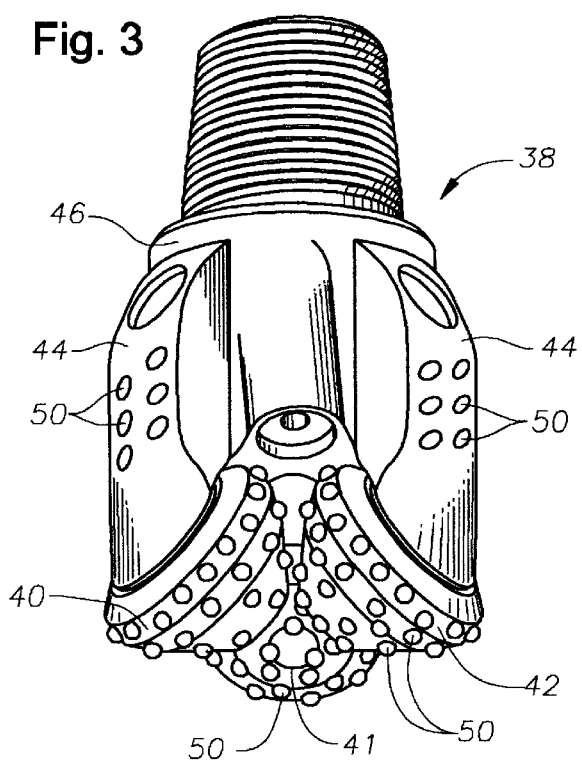
FIG. 3 is a perspective view of a rolling cutter rotary drill bit using a PCD element of the present invention.
Figure 5:
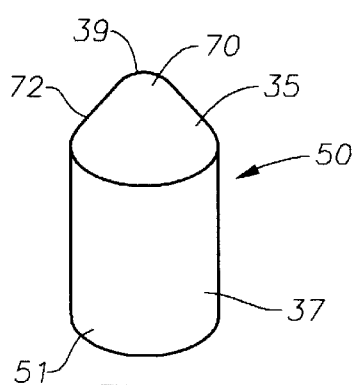
FIG. 5 is a perspective view of a dome shaped PCD element suitable for use in both rolling cutter drill bits and in fixed cutter drill bits.

In a second embodiment, the cutting element 50 (as shown in FIG. 5) of the present invention is on a rolling cutter type drill bit 38, shown in FIG. 3. A rolling cutter drill bit 38 typically has one or more truncated rolling cone cutters 40, 41, 42 assembled on a bearing spindle on the leg 44 of the bit body 46. The cutting elements 50 may be mounted as one or more of a plurality of cutting inserts arranged in rows on rolling cutters 40, 41, 42, or alternatively the PCD cutting elements 50 may be arranged along the leg 44 of the bit 38. The PCD cutting element 50 has a body in the form of a facing table 35 of diamond or diamond like material bonded to a less hard substrate 37. The facing table 35 in this embodiment of the present invention is in the form of a domed surface 39 and has working surfaces 70 and 72. Accordingly, there are often a number of transitional layers between the facing table 35 and the substrate 37 to help more evenly distribute the stresses generated during fabrication, as is well known to those skilled in the art.

In operation the rolling cutter drill bit 38 is rotated and weight is applied. This forces the cutting inserts 50 in the rows of the rolling cone cutters 40, 41, 42 into the earth, and as the bit 36 is rotated the rolling cutters 40, 41, 42 turn, effecting a drilling action.

In another embodiment, the PCD cutting element 52 of the present invention is in the form of a triangular, rectangular or other shaped material for use as a cutting insert in machining operations. In this embodiment, the cutting element 52 has a body in the form of a facing table 54 of diamond or diamond like material bonded to a less hard substrate 56 with working surfaces 70 and 72. Typically, the cutting element 52 would then be cut into a plurality of smaller pieces which are subsequently attached to an insert 58 that is mounted in the tool holder of a machine tool. The cutting element 52 may be attached to the insert by brazing, adhesives, welding, or clamping. It is also possible to finish form the cutting element 52 in the shape of the insert in a high-temperature high-pressure manufacturing process.

As previously mentioned, it is desirable to selectively treat the faces of these elements 50, 52 to provide selective wear resistance, as shown in FIGS. 13–36. Shown in these figures are numerous different ways this selective treatment may be applied.

In FIGS. 13–27B and 33–36, the PCD cutting elements 10 all have a portion 80 of the working surface 70, 72 which is treated as hereinbefore described to increase the wear resistance of the cutting elements 10. Each may also have another surface 82 which is not treated such that some catalyzing material 64 remains in the interstices 62. Alternatively, the another surface 84 may be only partially treated, or at least less treated than the surface 80. Shown in FIGS. 19A and 19B is a surface 86 that a gradual change in the treatment is indicated.

Figure 13:
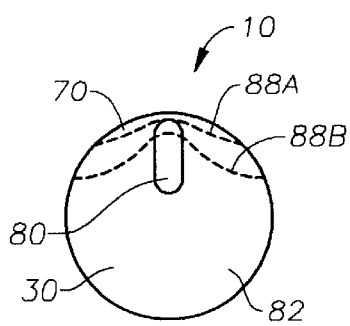
FIGS. 13–17 are front views showing different arrangements of varied wear resistance on the working surfaces of PCD cutting elements of the present invention.
Figure 14:
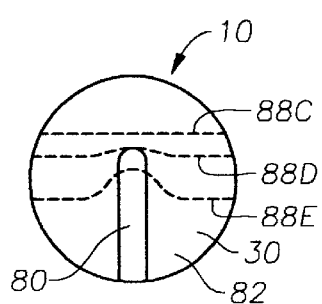

Describing the Figures in more detail, FIGS. 13–17 are front views of PCD cutting elements 10 showing different arrangements of varied wear resistance on the working surfaces. In FIGS. 13 and 14 the worn profile is indicated by numerals 88A, 88B, 88C. As can be seen, these worn profiles indicate the more wear resistant portions cause the element 10 to be self-sharpening. In FIG. 14, the element 10 wears in a relatively flat manner as indicated by 88C until enough wear has occurred to expose the more wear resistant portion. This allows an initial operation as a 'normal' element until the more wear resistant portion is exposed in 88D and 88E, where the element then becomes self-sharpening as can be seen.

Figure 15:
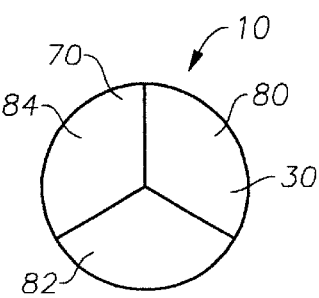
Figure 16:
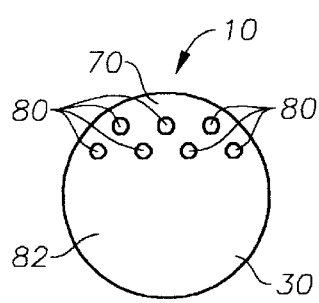
Figure 17:
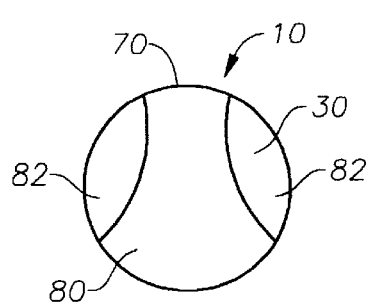
Figure 18:
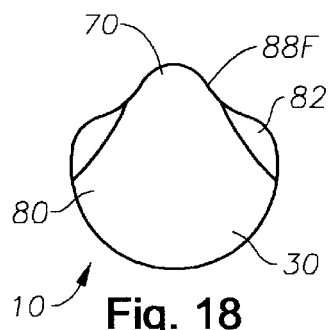
FIG. 18 is a front view showing the expected wear pattern of the PCD cutting element of FIG. 17.

Other possible arrangements are shown in FIGS. 15–18, a front view showing the expected wear pattern of the PCD cutting element of FIG. 17. Each has a treated surface 80 and a surface 82 which is not treated such that some catalyzing material 64 remains in the interstices 62. FIG. 15 shows another surface 84 which is only partially treated, or at least less treated than the surface 80.

Figure 19A:
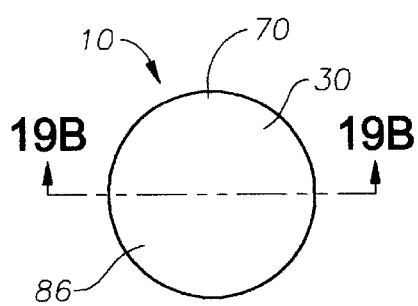
FIG. 19A is a front view showing an arrangement of a continuously varying wear resistance on the working surface of a PCD cutting element of the present invention.
Figure 20A:
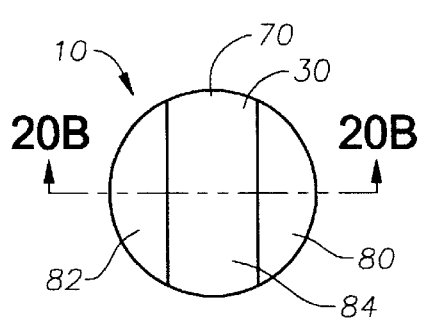
FIG. 20A is a front view showing another arrangement of varied wear resistance on the working surfaces of PCD cutting elements of the present invention.
Figure 19B:
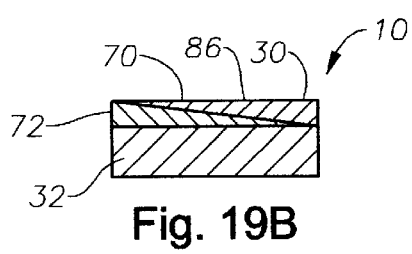
FIG. 19B is a section view of the PCD cutting elements of FIG. 19A showing the treatment gradient.
Figure 20B:
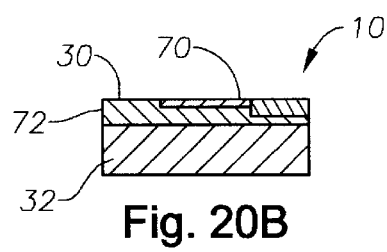
FIG. 20B is a section view of the PCD cutting elements of FIG. 20A showing the treatment gradient.
Figure 21A:
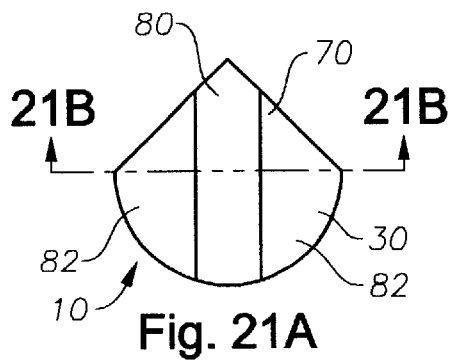
FIG. 21A is a front view showing another arrangement of varied wear resistance on the working surfaces of PCD cutting elements of the present invention.
Figure 22A:
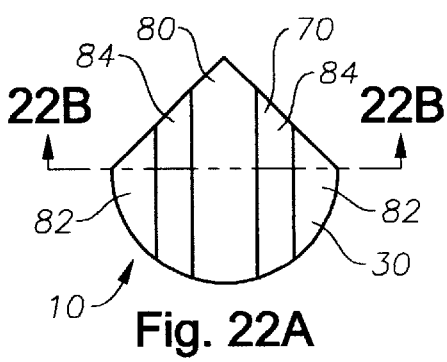
FIG. 22A is a front view showing another arrangement of varied wear resistance on the working surfaces of PCD cutting elements of the present invention.
Figure 21B:
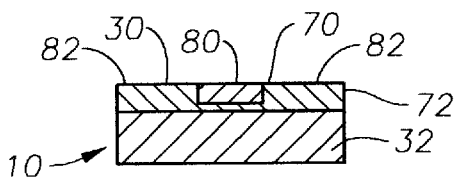
FIG. 21B is a section view of the PCD cutting element of FIG. 21A showing the treatment gradient.
Figure 22B:
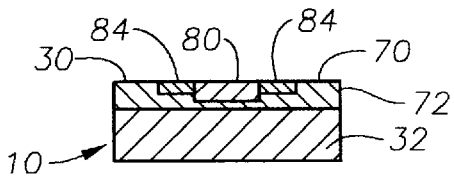
FIG. 22B is a section view of the PCD cutting element of FIG. 22A showing the treatment gradient.
Figure 23A:
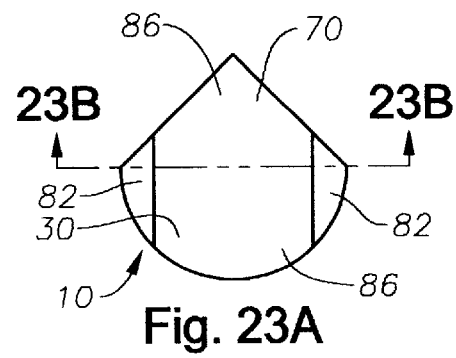
FIG. 23A is a front view showing another arrangement of varied wear resistance on the working surfaces of PCD cutting elements of the present invention.
Figure 24A:
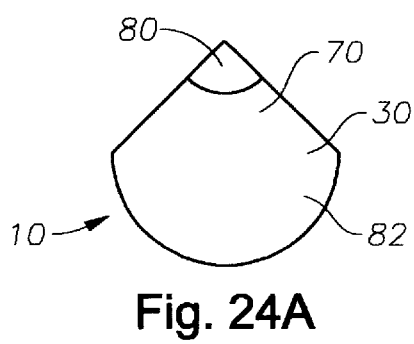
FIGS. 24A, 24B and 25 are front views showing different arrangements of varied wear resistance on the working surfaces of PCD cutting elements of the present invention.
Figure 23B:
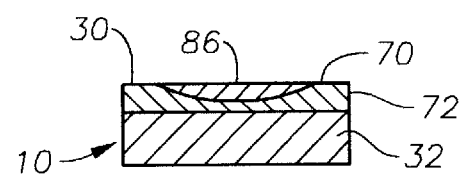
FIG. 23B is a section view of the PCD cutting element of FIG. 23A showing the treatment gradient.
Figure 24B:
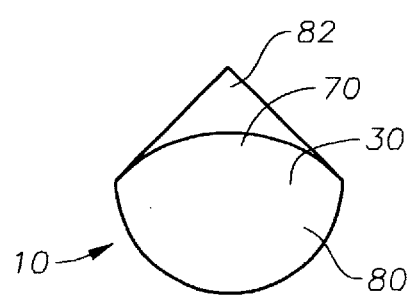
Figure 25:
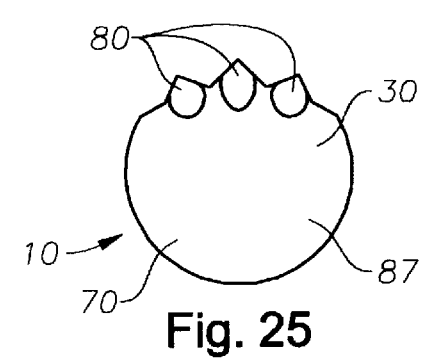

FIGS. 19A and 19B show a surface 86 where a gradual change in the treatment is indicated, and FIGS. 20A and 20B show three zones similar to FIG. 15. Other similar variations in the treatment are shown in FIGS. 21A to FIG. 25 where the elements 10 have a relative sharp cutting tip rather than the rounded tips previously shown. Again, each has a treated surface 80, 84, 86 and a surface 82 which is not treated such that some catalyzing material 64 remains in the interstices 62, as previously described.

Figure 26A:
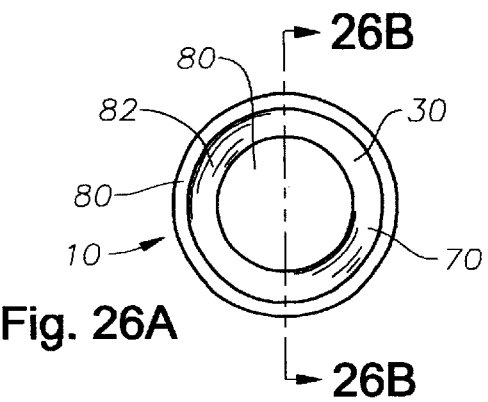
FIG. 26A is a front view showing another arrangement of varied wear resistance on the working surfaces of PCD cutting elements of the present invention.
Figure 27A:
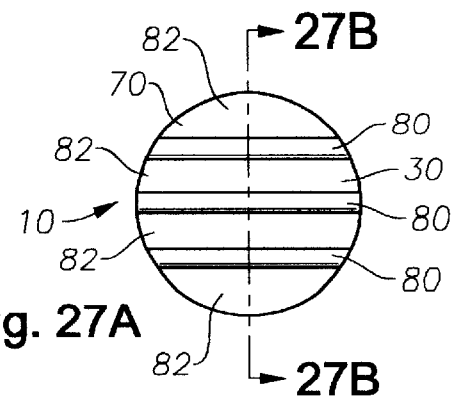
FIG. 27A is a front view showing another arrangement of varied wear resistance on the working surfaces of PCD cutting elements of the present invention.
Figure 26B:
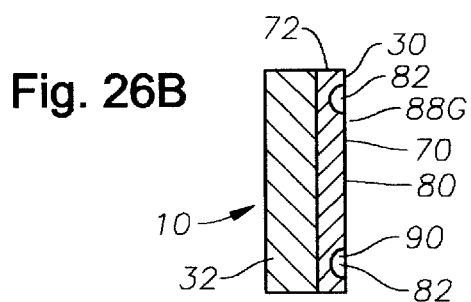
FIG. 26B is a section view showing how the PCD cutting element of FIG. 26A may wear in use.
Figure 27B:
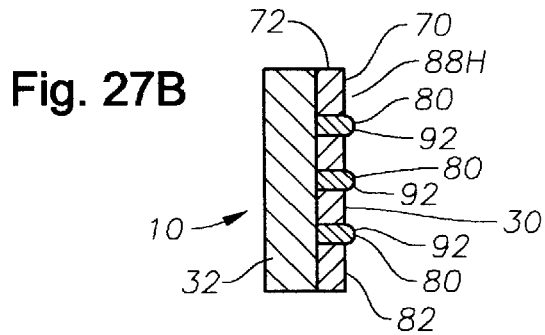
FIG. 27B is a section view showing how the PCD cutting element of FIG. 27A may wear in use.

FIGS. 26A–27B show more views of PCD cutting elements 10 with different arrangements of varied wear resistance on the working surfaces. In FIGS. 26B and 27B the worn profiles are indicated by numerals 88G, 88H. These Figures show cutters wearing in a beneficial mode. For example, FIGS. 26A and 26B show a chip breaking profile 90 forming as the element wears, and FIGS. 27A and 27B show cutting ridges 92 forming.

FIG. 28A–32B show arrangements of varied wear resistance on the working surfaces of domed shaped PCD cutting elements 50 suitable for use in other cutting applications. In a manner similar to what has been previously described, FIGS. 28A, 29A, 30A, 31 A, and 32A all show different arrangements with a treated surface 80 and a surface 82 which is not treated such that some catalyzing material 64 remains in the interstices 62. Although not shown, another surface 84 which is only partially treated, or at least less treated than the surface 80 may also be included.

Figure 28A:
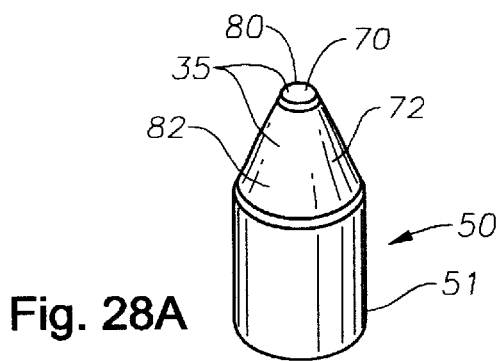
FIG. 28A is a front view showing an arrangement of varied wear resistance on the working surfaces of domed shaped PCD cutting elements of the present invention.
Figure 28B:
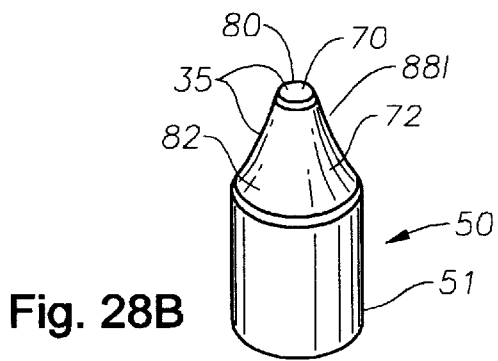
FIG. 28B is a section view showing how the PCD cutting element of FIG. 28A may wear in use.
Figure 29A:
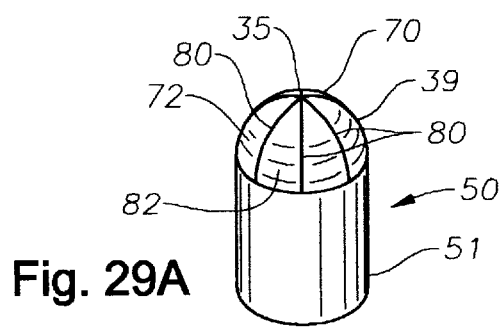
FIG. 29A is a front view showing an arrangement of varied wear resistance on the working surfaces of domed shaped PCD cutting elements of the present invention.
Figure 29B:
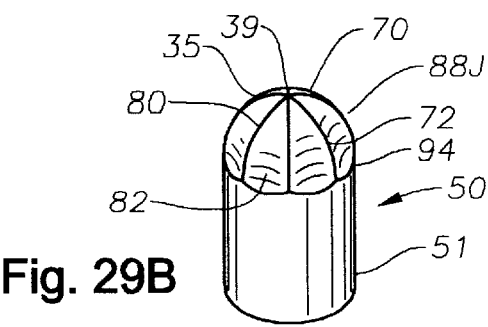
FIG. 29B is a section view showing how the PCD cutting element of FIG. 29A may wear in use.
Figure 30A:
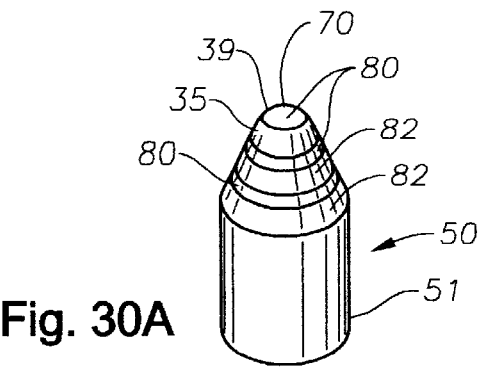
FIG. 30A is a front view showing an arrangement of varied wear resistance on the working surfaces of domed shaped PCD cutting elements of the present invention.
Figure 30B:
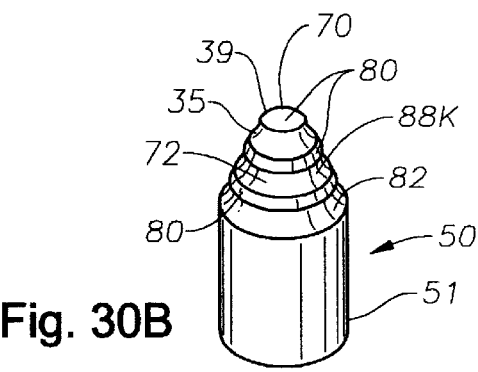
FIG. 30B is a section view showing how the PCD cutting element of FIG. 30A may wear in use.
Figure 31A:
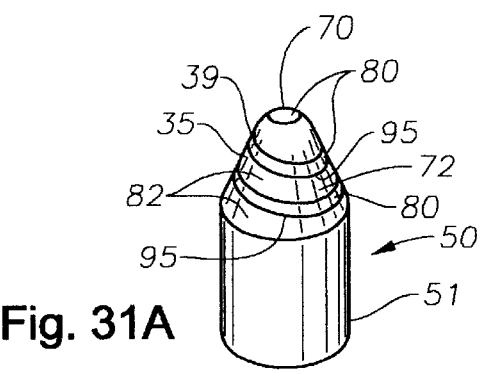
FIG. 31A is a front view showing an arrangement of varied wear resistance on the working surfaces of domed shaped PCD cutting elements of the present invention.
Figure 31B:
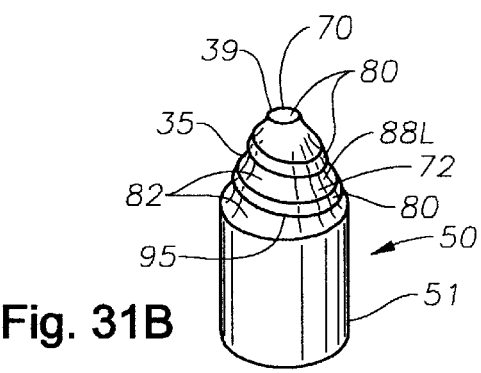
FIG. 31B is a section view showing how the PCD cutting element of FIG. 31A may wear in use.
Figure 32A:
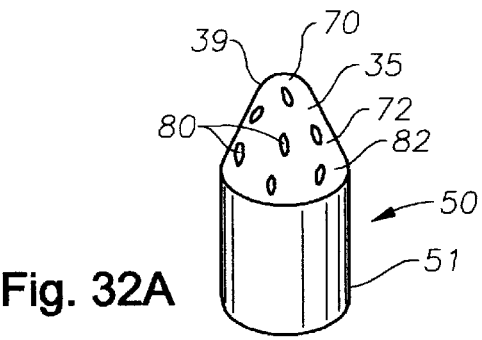
FIG. 32A is a front view showing an arrangement of varied wear resistance on the working surfaces of domed shaped PCD cutting elements of the present invention.
Figure 32B:
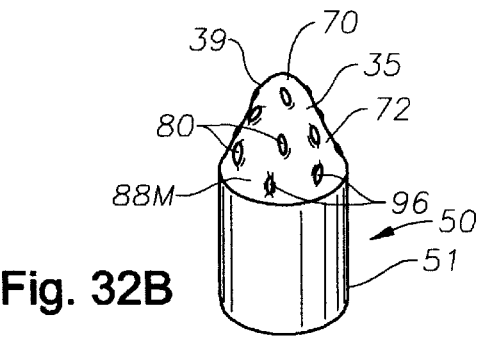
FIG. 32B is a section view showing how the PCD cutting element of FIG. 32A may wear in use.
Figure 33:
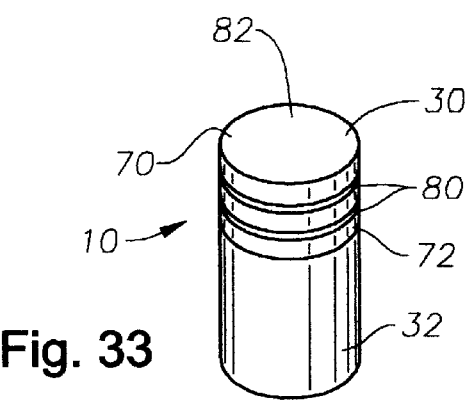
FIGS. 33–36 are perspective view s showing different arrangements of varied wear resistance on the front and side working surfaces of PCD cutting elements of the present invention.
Figure 34:
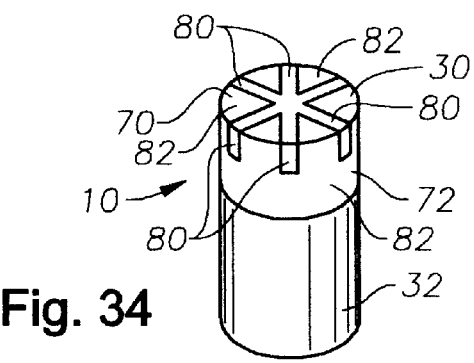
Figure 35:
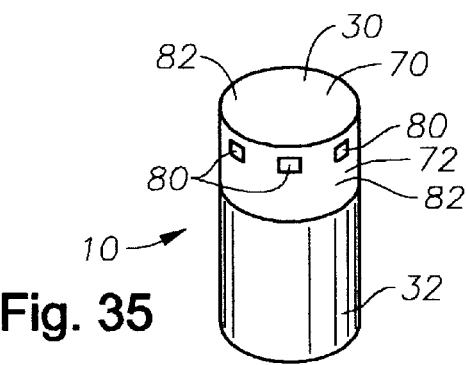
Figure 36:
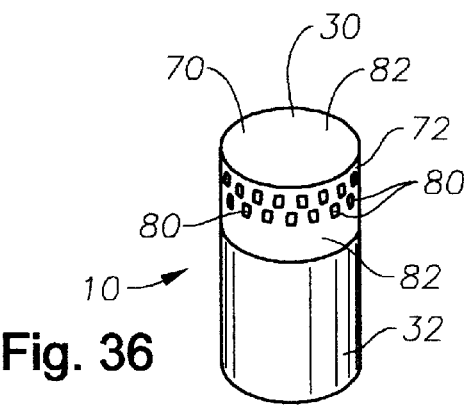

Corresponding FIGS. 28B, 29B, 30B, 31B, and 32B all show cutters wearing in a beneficial mode. FIG. 28B shows an inward taper wear mode revealed by wear profile 88I. FIGS. 29B, 30B, 31B show various configurations of ridges, such as the crests 94 of FIG. 29B revealed by wear profile 88J, the rings 96 of FIG. 30B revealed by wear profile 88K, the spiral 95 of FIG. 31B revealed by wear profile 88L, and the bumps 96 of FIG. 32B revealed by wear profile 88M.

FIGS. 33–36 are perspective views showing different arrangements of varied wear resistance on the front and side working surfaces of PCD cutting elements 10. Again, each has a treated surface 80 and a surface 82 which is not treated such that some catalyzing material 64 remains in the interstices 62, as previously described. These figures show elements 10 with two working surfaces 70, 72 that indicate the varied wear resistance may be applied to either or both surfaces. Although not shown, another surface 84, 86 (as previously described) which is only partially treated, or at least less treated than the surface 80 may also be included in place of portions of the untreated surface 82.

Whereas the present invention has been described in particular relation to the drawings attached hereto, it should be understood that other and further modifications apart from those shown or suggested herein, may be made within the scope and spirit of the present invention.

What is claimed is:

1. A PCD element comprising a body of bonded diamonds integrally formed with a metallic substrate, the body having a working surface and at least an 85% by volume diamond density, wherein a first volume of the body adjacent to the working surface contains a catalyzing material, a second volume of the body adjacent to the working surface is substantially free of the catalyzing material, and wherein the first volume and the second volume have substantially the same impact strength.

2. The PCD element of claim 1, wherein the second volume extends to a depth of at least about 0.1 mm from the working surface.

3. The PCD element of claim 2, wherein the second volume extends to a depth of between about 0.2 mm and 0.3 mm from the working surface.

4. The PCD element of claim 1, wherein the first volume of the body contacts the substrate and has an average thickness greater than 0.15 mm.

5. The PCD element of claim 1, wherein a majority of the catalyzing material remaining in the second volume of the body adheres to surfaces of diamond crystals.

6. The PCD element of claim 1, wherein an amount of catalyzing material within the second volume of the body continuously decreases with distance from the first volume.

7. The PCD element of claim 1 wherein the first volume comprises more than 30% of the body remote from the working surface.

8. The PCD element of claim 7 wherein the substrate is tungsten carbide with an iron group binder material.

9. The PCD element of claim 1 comprising a preform cutting element having a facing table and a cutting surface, wherein the working surface comprises a portion of the cutting surface.

10. The PCD element of claim 9, wherein the cutting element is mounted upon a cutting face of a fixed cutter rotary drill bit.

11. The PCD element of claim 9, wherein the cutting element is mounted upon a body of a rolling cutter drill bit.

12. The PCD element of claim 1, wherein the body comprises diamond crystals and an interstitial matrix, and wherein the part of the interstitial matrix located within the second volume is substantially free of the catalyzing material, and the interstitial matrix where the body contacts the substrate contains the catalyzing material and has an average thickness greater than 0.15 mm.

13. The PCD element of claim 12, wherein the second volume extends to a depth of at least about 0.1 mm from the working surface.

14. The PCD element of claim 13, wherein the second volume extends to a depth of between about 0.2 mm and 0.3 mm from the working surface.

15. The PCD element of claim 12 wherein the first volume comprises more than 30% of the body remote from the working surface.

16. The PCD element of claim 12, wherein a majority of diamond crystals located within the second volume of the body have a surface which is substantially free of catalyzing material.

17. The PCD element of claim 12, wherein a majority of the catalyzing material remaining in the second volume of the body adheres to surfaces of the diamond crystals.

18. The PCD element of claim 12, wherein the diamond crystals in the second volume remote from the first volume have less catalyzing material adhering to their surfaces than the diamond crystals in the second volume which are adjacent to the first volume.

19. The PCD element of claim 12, wherein an amount of catalyzing material within the second volume of the body continuously decreases with distance from the first volume.

20. The PCD element of claim 14 comprising a preform cutting element having a facing table and a cutting surface, wherein the working surface comprises a portion of the cutting surface.

21. The PCD element of claim 20, wherein the cutting element is mounted upon a cutting face of a fixed cutter rotary drill bit.

22. The PCD element of claim 20, wherein the cutting element is mounted upon a body of a rolling cutter drill bit.

23. The PCD element of claim 12, comprising a cutting element with a cutting surface adapted for use as a cutting insert in a machining operation, wherein the working surface comprises a portion of the cutting surface.

24. The PCD element of claim 12, comprising a drawing die, wherein the working surface comprises a portion of the drawing die contact surface.

25. The PCD element of claim 12 wherein the substrate is tungsten carbide with an iron group binder material.

26. A preform cutting element comprising a body of a superhard polycrystalline material comprising a plurality of partially bonded superhard crystals integrally formed with a metallic substrate, a plurality of interstitial regions among the superhard crystals and a catalyzing material, the body having at least an 85% by volume diamond density and a cutting surface, wherein the interstitial regions adjacent to at least a first portion of the cutting surface are substantially free of the catalyzing material, the interstitial regions adjacent to a second portion of the cutting surface contain the catalyzing material, and the interstitial regions where the body contacts the substrate contain the catalyzing material and have an average thickness greater than 0.15 mm, and wherein the first portion of the cutting surface and the second portion have substantially the same impact strength.

27. The preform cutting element of claim 26, wherein the cutting element is mounted upon a cutting face of a fixed cutter rotary drill bit.

28. The preform cutting element of claim 26, wherein the cutting element is mounted upon a body of a rolling cutter drill bit.

29. The preform cutting element of claim 26, comprising a cutting element with the cutting surface adapted for use as a cutting insert in a machining operation.

30. The preform cutting element of claim 26 wherein the substrate is tungsten carbide with an iron group binder material.

31. A PCD element comprising a diamond containing body integrally formed with a metallic substrate, the body having at least an 85% by volume diamond density and an interstitial matrix, a first portion of the interstitial matrix in the body adjacent to a working surface is substantially free of the catalyzing material, a second portion of the interstitial matrix in the body adjacent to a working surface contains the catalyzing material, and the interstitial matrix where the body contacts the substrate contains the catalyzing material and has an average thickness greater than 0.15 mm, and wherein the first portion of the interstitial matrix and the second portion of the interstitial matrix have substantially the same impact strength.

32. The PCD element of claim 31, wherein the interstitial matrix in the body adjacent to the working surface is substantially free of the catalyzing material to a depth of at least about 0.1 mm from the working surface.

33. The PCD element of claim 32, wherein the first portion of the interstitial matrix in the body adjacent to the working surface is substantially free of the catalyzing material to a depth of between about 0.2 mm and 0.3 mm from the working surface.

34. The PCD element of claim 31, wherein the first portion of the interstitial matrix in the body adjacent to the working surface of the body has a diamond density higher than elsewhere in the body.

35. The PCD element of claim 31, wherein a majority of the catalyzing material remaining in the second portion of the interstitial matrix in the body adjacent to the working surface adheres to surfaces of diamond crystals.

36. The PCD element of claim 31, wherein an amount of catalyzing material within the first portion of the interstitial matrix in the body adjacent to the working surface continuously decreases with distance from the remaining interstitial matrix.

37. The PCD element of claim 31 comprising a preform cutting element having a facing table and a cutting surface, wherein the working surface comprises a portion of the cutting surface.

38. The PCD element of claim 37, wherein the cutting element is mounted upon a cutting face of a fixed cutter rotary drill bit.

39. The PCD element of claim 37, wherein the cutting element is mounted upon a body of a rolling cutter drill bit.

40. The PCD element of claim 37 wherein the substrate is tungsten carbide with an iron group binder material.

41. A PCD element comprising a body integrally formed with a metallic substrate, the body comprising a plurality of bonded diamond crystals having surfaces and a catalyzing material, the body having at least an 85% by volume diamond density, wherein at least 30% of the crystals in the body contact the catalyzing material and the surfaces of a majority of the remaining crystals that are within at least a 0.1 mm depth from a working surface are substantially free of the catalyzing material, wherein the body has a substantially uniform impact strength.

42. The PCD element of claim 41, wherein said majority of the crystals in the body are within between about 0.2 mm and 0.3 mm depth from the working surface.

43. The PCD element of claim 41 wherein the substrate is tungsten carbide with an iron group binder material.

44. A method of manufacture of a PCD element comprising a body integrally formed with a metallic substrate, the body comprising bonded diamond crystals and a catalyzing material, by treating the body to render a volume thereof substantially free of the catalyzing material while permitting the catalyzing material to remain in at least some of the remaining volume of the body, and while permitting the substrate to remain substantially unaffected when treating the body, and while also providing the body with a substantially uniform impact strength.

45. The method of claim 44, wherein the volume is rendered substantially free of catalyzing material by leaching the catalyzing material from the second volume.

46. The method of claim 44, wherein the volume is rendered substantially free of catalyzing material by converting the catalyzing material in the second volume to a form in which it does not have a catalyzing effect.

47. The method of claim 44, wherein the volume is rendered substantially free of catalyzing material by reacting the catalyzing material to form a substance which does not have a catalyzing effect.

48. The method of claim 44, wherein the volume is rendered substantially free of catalyzing material by electrical discharge.

49. The method of claim 44, wherein the volume is rendered substantially free of catalyzing material using a galvanic process.

50. The method of claim 44, wherein the volume is rendered substantially free of catalyzing material using an evaporation process.

* * * * *